(12) United States Patent
Kommareddi et al.

(10) Patent No.: US 6,841,593 B2
(45) Date of Patent: Jan. 11, 2005

(54) MICROENCAPSULATED AND MACROENCAPSULATED DRAG REDUCING AGENTS

(75) Inventors: Nagesh S. Kommareddi, Tulsa, OK (US); Ryan Dinius, Broken Arrow, OK (US); Niraj Vasishtha, San Antonio, TX (US); Darren Eugene Barlow, San Antonio, TX (US)

(73) Assignee: Baker Hughes Incorporated, Houston, TX (US)

( * ) Notice: Subject to any disclaimer, the term of this patent is extended or adjusted under 35 U.S.C. 154(b) by 400 days.

(21) Appl. No.: 09/900,342

(22) Filed: Jul. 5, 2001

(65) Prior Publication Data

US 2003/0013783 A1 Jan. 16, 2003

(51) Int. Cl.[7] .............................. C08K 9/10; C08K 9/00; B05D 5/08
(52) U.S. Cl. ....................... 523/175; 523/205; 523/206; 523/210; 528/502
(58) Field of Search ................................ 523/175, 205, 523/206, 210; 528/502

(56) References Cited

U.S. PATENT DOCUMENTS

| | | |
|---|---|---|
| 2,879,173 A | 3/1959 | Yacoe |
| 3,559,664 A | 2/1971 | Seymour |
| 3,692,676 A | 9/1972 | Culter |
| 3,736,288 A | 5/1973 | Stratta et al. |
| 3,762,888 A | 10/1973 | Kober et al. |
| 3,854,893 A | 12/1974 | Rossi |
| 3,884,252 A | 5/1975 | Kruka |
| 3,910,856 A | 10/1975 | Kruka et al. |
| 4,123,403 A | 10/1978 | Warner et al. |
| 4,147,677 A | 4/1979 | Lundberg et al. |
| 4,156,767 A | 5/1979 | Hall |
| 4,177,177 A | 12/1979 | Vanderhoff et al. |
| 4,212,312 A | 7/1980 | Titus |
| 4,427,794 A | 1/1984 | Lange et al. |
| 4,499,214 A | 2/1985 | Sortwell |
| 4,510,304 A | 4/1985 | Hadermann |
| 4,527,581 A | 7/1985 | Motier |
| 4,584,244 A | 4/1986 | Fenton |
| 4,588,640 A | 5/1986 | Matlach |
| 4,659,334 A | 4/1987 | Matlach |
| 4,693,321 A | 9/1987 | Royer |
| 4,720,397 A | 1/1988 | O'Mara et al. |
| 4,789,383 A | 12/1988 | O'Mara et al. |
| 4,826,728 A | 5/1989 | O'Mara et al. |
| 4,837,249 A | 6/1989 | O'Mara et al. |
| 4,845,178 A | 7/1989 | Hostetler et al. |
| 5,165,440 A | 11/1992 | Johnston |
| 5,169,074 A | 12/1992 | Fauth et al. |
| 5,244,937 A | 9/1993 | Lee et al. |
| 5,376,697 A | 12/1994 | Johnston et al. |
| 5,504,131 A | 4/1996 | Smith et al. |
| 5,504,132 A | 4/1996 | Smith et al. |
| 5,539,044 A | 7/1996 | Dindi et al. |
| 5,605,966 A | 2/1997 | Schuler et al. |
| 5,733,953 A | 3/1998 | Fairchild et al. |
| 6,126,872 A | 10/2000 | Kommareddi et al. |
| 6,160,036 A | 12/2000 | Kommareddi et al. |
| 2003/0113445 A1 * | 6/2003 | Martin ........................ 427/180 |

FOREIGN PATENT DOCUMENTS

| | | |
|---|---|---|
| CA | 675522 A1 | 12/1963 |
| EP | 0 196 350 B1 | 10/1986 |
| WO | WO 93/22537 | 11/1993 |
| WO | WO 98/16586 A1 | 4/1998 |
| WO | WO 2003/106809 A1 | 12/2003 |

OTHER PUBLICATIONS

Polyethylene Oxide, M.W. 100,000, p. 1245, Aldrich Chemical Catalog, 1988–1989.*
DIALOG database record for EP 639240, patent document published Feb. 22, 1995.
Derwent/WPI Abstract 1976–73139X/197639 to JP 51092508.
C. B. Lester, "What to Expect From and How to Handle Commercially Available Drag–Reducing Agents," Oil & Gas Journal, Mar. 11, 1985. pp. 116–119.
J. Franjione, et al., "The Art and Science of Microencapsulation," Technology Today, Jun., 1995.

* cited by examiner

Primary Examiner—Tae H. Yoon
(74) Attorney, Agent, or Firm—Madan, Mossman & Sriram P.C.

(57) ABSTRACT

High concentration drag reducing agents may be prepared by microencapsulating and/or macroencapsulating polymer drag reducing agent. The encapsulation may be performed prior to, during, or after the polymerization of monomer into effective drag reducing polymer. If encapsulation is done before or during polymerization, a catalyst may be present, but little or no solvent is required. The result is very small scale bulk polymerization within the capsule. The inert capsule or shell may be removed before, during or after introduction of the encapsulated drag reducer into a flowing liquid. No injection probes or other special equipment is expected to be required to introduce the drag reducing slurry into the liquid stream, nor is grinding (cryogenic or otherwise) of the polymer necessary to form a suitable drag reducing agent.

37 Claims, 2 Drawing Sheets

MICROENCAPSULATED AND MACROENCAPSULATED DRAG REDUCING AGENTS

FIELD OF THE INVENTION

The invention relates to encapsulating compounds to be added to fluids to modify a characteristic thereof, more particularly to agents to be added to fluids flowing through a conduit to reduce the drag therethrough, and most particularly to encapsulated drag reducing agents (EDRAs) for liquids such as hydrocarbons, aqueous solutions, and emulsions of water and hydrocarbons. The drag reducing agents are encapsulated in a shell that is removed prior to, during and/or after introduction of the EDRA into the flowing fluid.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries of ground polymers to form particulates. A problem generally experienced with simply grinding the poly-alpha-olefins (PAOs) is that the particles will "cold flow" or stick together after the passage of time, thus making it impossible to place the PAO in the hydrocarbon in a form that will dissolve or otherwise mix with the hydrocarbon in an efficient manner. Further, the grinding process degrades the polymer, thereby reducing the drag reduction efficiency of the polymer.

One common solution to preventing cold flow is to coat the ground polymer particles with an anti-agglomerating agent. Cryogenic grinding of the polymers to produce the particles prior to or simultaneously with coating with an anti-agglomerating agent has also been used. However, some powdered or particulate DRA slurries require special equipment for preparation, storage and injection into a conduit to ensure that the DRA is completely dissolved in the hydrocarbon stream.

Gel or solution DRAs have also been tried in the past. However, these drag reducing gels also demand specialized injection equipment, as well as pressurized delivery systems. They are also limited to about 10% polymer as a maximum concentration in a carrier fluid due to the high solution viscosity of these DRAs. Thus, transportation costs of the DRA are considerable, since up to about 90% of the volume being transported and handled is inert material.

Thus, it would be desirable if a drag reducing agent could be developed which rapidly dissolves in the flowing hydrocarbon, which could minimize or eliminate the need for special equipment for preparation and incorporation into the hydrocarbon, and which could be formulated to contain much greater than 10% polymer.

SUMMARY OF THE INVENTION

Another object of the invention is to provide a high solids DRA that does not require the use of a gel or solution DRA as the raw material.

Other objects of the invention include providing a DRA that can be readily manufactured and which does not require special equipment for placement in a conduit transporting hydrocarbons or other fluids.

Another object of the invention is to provide a DRA that does not cold flow upon standing.

In carrying out these and other objects of the invention, there is provided, in one form, a microencapsulated compound for modifying a characteristic of a fluid, which includes a core containing the compound, and a shell encapsulating the core, where the shell is inert to the core. The compound inside the microcapsule may modify the physical and/or chemical characteristics of the fluid. Physical characteristics of the fluid modified by such compounds may include, but are not limited to, viscosity (e.g. thickeners and the like), flow resistance (drag), and surface activity (e.g. surfactants and the like), and the like. Chemical characteristics of the fluid modified by such compounds, may include, but are not limited to, corrosivity, scale formation, polymerization, inhibition of polymerization, pH, and the like. The compound that is microencapsulated may be already formed polymers, and/or monomers that are to be polymerized within the shell, where the shell is inert to the monomer polymerization.

In another embodiment of the invention, there is provided, in another form, a microencapsulated drag reducing agent (MDRA) for reducing drag in a liquid stream. The MDRA has a core reactive material that includes a monomer, possibly solvent for the monomer and eventually polymer from the monomer, and a shell that encapsulates the core reaction material. The shell is inert to the monomer polymerization. Polymerization occurs by known mechanisms during, before or after encapsulation. The outside diameter of the MDRA may be from about 20 to about 1000 microns. The shell is removed before, during or after the introduction of the MDRA into the flowing fluid.

Another embodiment of the invention involves a particulate compound for modifying a characteristic of a fluid having a core comprising a compound that includes polymers formed within the shell and/or monomers that are polymerized within the shell, where the shell is inert to monomer polymerization. The particulate compound also includes a shell encapsulating the core, where the shell is inert to the core. The encapsulated compound (shell and core) is ground to form the particulate compound.

An additional embodiment of the invention concerns an encapsulated compound for modifying a characteristic of a fluid that includes a core comprising a compound that may include polymers formed within a shell and/or monomers that are polymerized within the shell. A barrier layer is present between the shell and the core. The barrier layer is inert to monomer polymerization and the shell encapsulates a barrier layer and the core.

A further embodiment of the invention includes an encapsulated drag reducing agent (EDRA) for reducing drag in a liquid stream that includes a core reaction material comprising a monomer and a pre-polymerized catalyst and a shell encapsulating the core reaction material, where the shell is inert to the monomer polymerization, and where the monomer is polymerized within the shell.

In another embodiment of the invention, prepolymerized DRA could be co-extruded with a polymeric wall or outer cylindrical sleeve or layer that could be pinched by a "pinching and chopping" device. The outer wall or sleeve would be pinched or folded around the cut ends of the DRA to protect the cut ends from cold flowing with other ends with which it comes into contact.

Another embodiment of the invention involves an encapsulated compound for modifying a characteristic of a fluid including a core including polymers formed within the shell and/or monomers which are polymerized within the shell, where the shell is inert to monomer polymerization. The encapsulated compound further includes a shell encapsulating the core, where the shell is at least partially composed of polyethylene oxide of a molecular weight equal to or greater than 100,000 weight average molecular weight, that forms a skin on its outer surface and enables a stable core/shell capsule to form.

A further embodiment of the invention involves an encapsulated compound for modifying a characteristic of a fluid that includes a core comprising the compound that may include polymers formed within the shell and/or monomers that are polymerized within the shell, where the shell is inert to monomer polymerization. The encapsulated compound also includes a shell encapsulating the core, where materials forming the shell have their water content reduced by a method selected from the group consisting of vacuum stripping, molecular sieves, and combinations thereof.

One other embodiment of the invention concerns a blend of drag reducing agents (DRAs) where one of the DRAs is at least one encapsulated compound having a core including the compound of polymers formed within the shell and/or monomers which are polymerized within the shell, where the shell is inert to monomer polymerization. The encapsulated compound also includes a shell encapsulating the core to produce an encapsulated drag reducing agent (EDRA). The blend further includes a second drag reducing agent produced by a process of providing a slurry of drag reducing polymer particles in a liquid which is a non-solvent for the polymer particles; and removing at least a portion of the non-solvent liquid.

It will be appreciated that the Figures are not to scale and that some features may have been exaggerated for clarity.

DETAILED DESCRIPTION OF THE INVENTION

High concentration drag reducing agent may be encapsulated in an inert shell before, during, and/or after polymerization of the monomer in the core reaction material. Encapsulated drag reducing agent (EDRA) may then be introduced into a flowing fluid stream, such as an aqueous solution, a hydrocarbon stream, an emulsion of water and a hydrocarbon, etc. The shell may be removed from the polymerized core before, during, and/or after the EDRA is placed in the fluid stream. It most cases, it will be preferred that the shell is removed just prior to, during and/or after introduction of the EDRA into the fluid.

It has further been discovered that microencapsulation is an ideal way of delivering nearly any compound into a fluid where the compound may modify a characteristic of the fluid, and particularly where it is useful or desirable to keep the compound in a particulate, flowable form. For example, it may be desirable to deliver an acidic component to a remote location, such as the production zone at the bottom of an oil well bore without exposing the entire production string to the acid. The acid may be microencapsulated in a shell that would melt or dissolve only at the temperatures of the production zone and not before. While a primary focus of the invention is on microencapsulated DRAs (MDRAs), many of the same considerations apply to larger-sized macroencapsulated DRAs (macroDRAs) that will be described in further detail below.

Microencapsulation

Microencapsulation is known technology. However, the use of microencapsulation techniques to encapsulate monomers that are to be polymerized into drag reducing polymers; monomers being polymerized; and preformed high concentration, precipitated polymers, and the like is unknown. The microencapsulation provides a shell around the drag reducing polymer that keeps the polymer from agglomerating or "cold flowing" together into an intractable mass. Thus, the MDRA may be easily handled in dry, particulate form and transported at low cost without having to ship a solvent, carrier or slurry agent with it. If a solvent or carrier (i.e. a delivery medium) is necessary to inject the MDRA into the fluid stream, this can be provided locally at low cost. Then, before, during or after introduction of the MDRA into the stream, the shell is removed.

Figure 1:
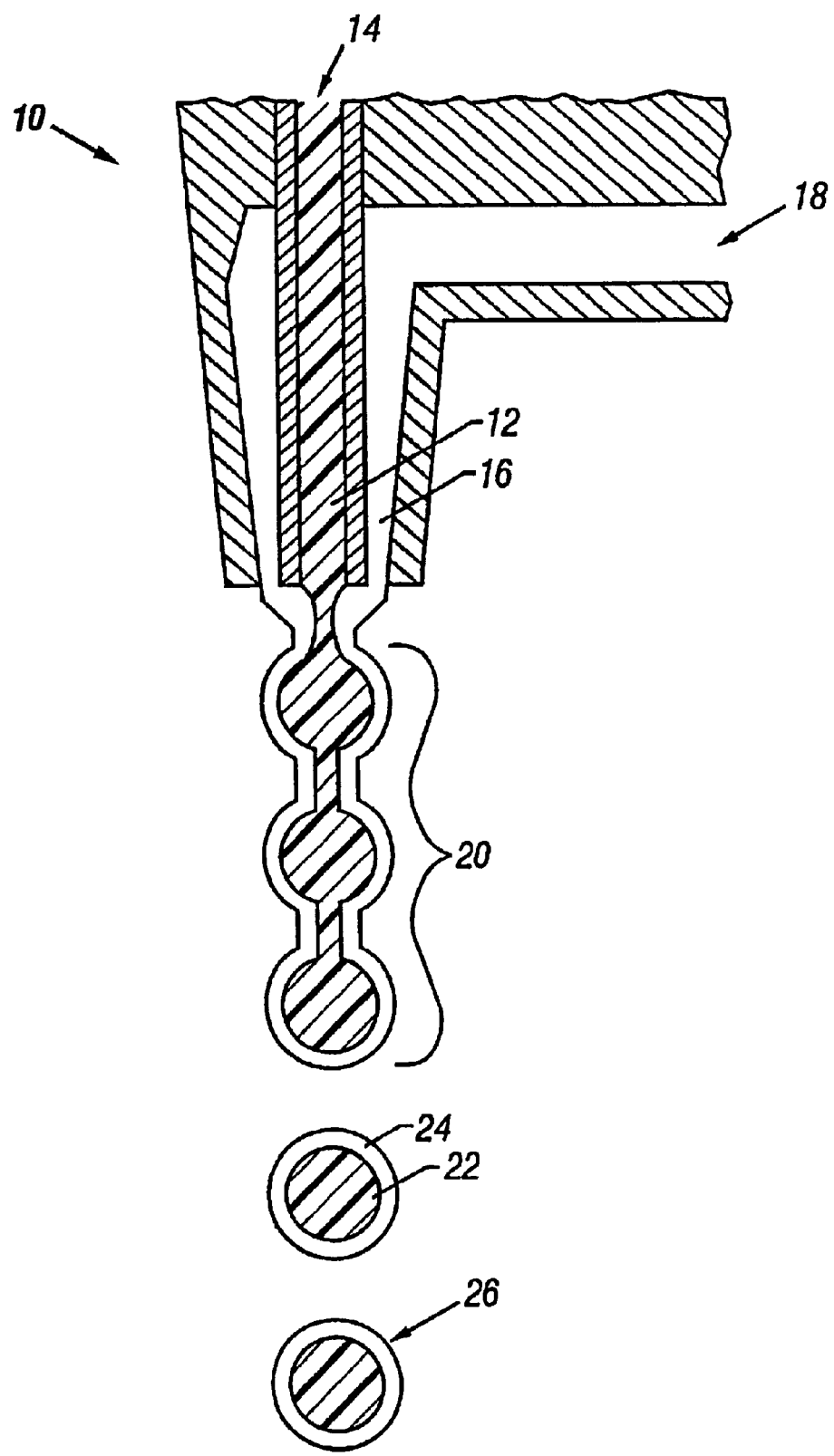
FIG. 1 is a detailed, sectional view of a stationary extrusion nozzle forming a microencapsulated drag reducing agent by axisymmetric jet breakup.

Microencapsulation techniques suitable for the MDRAs of this invention include, but are not necessarily limited to stationary extrusion, centrifugal extrusion, vibrating nozzle, submerged nozzle extrusion, emulsification, emulsification, rotating disk, interfacial polymerization, complex coacervation, suspension polymerization, and in situ polymerization. Shown in FIG. 1 is a detailed, cross-sectional view of a stationary extrusion nozzle 10 having a central bore 12 for introduction of core material 14 and a surrounding annulus 16 for extrusion of the shell material 18. Different phenomena are observed when the materials 14 and 18 are extruded at different rates, i.e. the mode of compound drop formation changes. At low flow rates, drop formation is orderly and regular and the drops are uniform. At higher flow rates, compound drops 20 form due to axisymmetric breakup of the jet of combined materials. At still higher flow rates, breakup of the jet occurs via different mechanisms and the capsule size distribution is much broader, which is usually less desirable. If the nozzle 10 is vibrated during axisymmetric breakup, capsule size distribution can be controlled to give capsules having relatively uniform diameter cores 22 and shells 24. The production rates of the MDRAs 26 is thus maximized for a given, relatively narrow size distribution.

Microencapsulation of a compound, such as a drag reducing agent (DRA) could be performed by first providing a slurry of DRA polymer particles in a liquid which is a non-solvent for the polymer particles. Next, a shell material is added to the slurry. The shell material could be in particulate form and insoluble in the non-solvent to the DRA polymer. At elevated temperatures, the particulate shell material could melt into a liquid and coat the DRA particles. For example, if the shell material is hydrophobic as well as insoluble in the non-solvent, then it would coat the DRA particles. In one preferred non-limiting embodiment, the shell material could also be soluble in the non-solvent for the DRA polymer. In these situations, the shell material will be coated onto the DRA particles by the precipitation of the shell material when the liquid non-solvent is removed.

A further non-limiting embodiment of the invention would involve mixing a particulate shell material with a non-solvent for the core, which contains solvent in a dissolved state or non-solvent in a dispersed state. The non-solvent is subsequently evaporated or otherwise separated during the extrusion process, and the shell is fused together by interfacial energy forming a wall upon heating. A similar embodiment is plausible in combination with the embodiment described in FIG. 2.

In one non-limiting embodiment of the invention, the ratio of average diameter of the shell particles (which could be a different kind of polymer from the core DRA particles) to core DRA polymer particles is from about 1.02:1.0 to about 2.7:1.0, preferably from about 1.1:1.0 to about 1.26:1.0. Next, at least a portion of the non-solvent liquid is removed; it is preferred that as much as possible of the non-solvent liquid is removed, even all of it, al-though some diminishingly small amount may remain due to the incomplete ability of conventional removal processes. Microencapsulation processes to make the MDRA according to this last method may include, but are not necessarily limited to rotating disk, interfacial polymerization, complex coacervation, suspension polymerization processes and the like.

Macroencapsulation

Many of the same considerations that apply to microencapsulation apply in the case of microencapsulation. As these terms are used herein, a microcapsule is one having a diameter of 5000 microns or less, whereas a macrocapsule has a diameter of greater than 5000 microns (0.5 cm) up to about 15,000 microns (1.5 cm).

One difference between macrocapsules and microcapsules is that the tendency of the shell to poison the catalyst used to polymerize the monomer in the core is reduced in the case of macrocapsules, depending of course on the particular system. For instance, in the case of a constant shell thickness of approximately 150 $\mu$m the ratio of inner surface area to volume of the core is relatively much greater (by about 148%) for a typical microcapsule (e.g. 3000 $\mu$m in diameter) than for a macrocapsule (e.g., 7000 $\mu$m in diameter), and thus the capability of poisons in the shell material to diffuse through the core and poison the catalyst is greater for a microcapsule than a macrocapsule. In this comparison, for the same shell, monomer and catalyst system, monomer conversions of greater than about 60% are possible with macrocapsules as compared with 25–30% for microcapsules. Conversions of about 60 to about 80% are preferred in one non-limiting embodiment of the invention.

Although EDRAs the size of macrocapsules are generally too large to be conveniently used directly for placement into a flowing liquid since it would take too long for the shell and core to dissolve, macrocapsules could still be used directly in some specialized situations. For example the macrocapsules could be injected on the suction (low pressure) side of the pumps used to transport fluids through conduits. The shearing action of the pumps could speed up the dissolution of the polymer cores. Conduits carrying fluids over long distances are especially well suited for treatment with macrocapsules, as the slow dissolution over extended distances ensures sustained drag reduction performance. Along the same lines, the macrocapsules could be blended with the microcapsules and injected into the flowing fluid. The microcapsules would provide the initial drag reduction and the macrocapsules would provide the sustained drag reduction. In one preferred embodiment, the macrocapsules may then be ground to a size appropriate to be directly used in a flowing liquid. The grinding or particle size reduction may be performed by any suitable attrition method including, but not necessarily limited to, pressure grinding, cryogenic grinding, attrition mills, rotor/stator homogenizers. In a non-limiting embodiment, the size of the particulate compounds after grinding may range from about 10 to about 2000 microns, preferably from about 100 to about 1000 microns.

While it is possible that in some embodiments the presence of shell material in the ground product may help prevent cold flow of the core polymers, it is another embodiment of the invention to use an anti-agglomeration agent during and/or after grinding to coat the surfaces of the core polymer to reduce or prevent cold flow. Suitable anti-agglomeration agents are polyethylene glycols, methoxylated polyethylene glycols, magnesium stearate, calcium stearate, polyethylene waxes, inorganic clays, described below.

From a grinding point of view, the macrocapsules are unique in the sense that the shell material encapsulating the polymer acts as an anti-agglomeration agent.

Core Material

In one embodiment of the invention, the core 22 is a monomer which, when polymerized, forms a polymer suitable for use as a drag reducing agent (DRA). Such monomers are well known in the art and include, but are not necessarily limited to, alpha-olefins, such as 1-hexene, 1-octene, 1-decene, 1-dodecene, 1-tetradecene, and the like; isobutylene; alkyl acrylates; alkylmethacrylates; alkyl styrene; and the like. Copolymers of these monomers may also make suitable drag reducing agents. Polymers and copolymers from the afore-mentioned monomers are suitable hydrocarbon drag reducers.

Aqueous drag reducers (for reducing drag of water and aqueous solutions) may include, but are not necessarily limited to, copolymers of acrylamide; sodium acrylate; sodium 2-acrylamido-2-methyl propane sulfonate; N-isopropyl acrylamide; and the like. Of course, the drag reducing polymer must be soluble in the fluid into which it is introduced so that it may improve its fluid flow characteristics. For example, a polymer used to improve the fluid flow of a hydrocarbon, such as crude oil, could be a polyalpha-olefin. Polyalpha-olefins would not be suitable as a DRA for an aqueous fluid.

Polyalpha-olefins, which in one embodiment are preferred herein, are polymerized from the monomers or comonomers by conventional techniques and will have molecular weights above 10 million. Polyalpha-olefins particularly suitable for the processes and compositions of this invention include the FLO® family of PAO DRAs, including FLO® 1004, FLO® 1005, FLO® 1008, FLO® 1010, FLO® 1012, FLO® 1020 and FLO® 1022 DRAs sold by Baker Pipeline Products, a division of Baker Petrolite Corporation. These DRAs are used for hydrocarbon streams.

A particular advantage of the microencapsulation technique of this invention is that the polymerization may be conducted entirely within the microcapsule (or macrocapsule) small scale bulk polymerization conditions in the absence of a solvent, or in the presence of only a very small amount of solvent. Conventionally, production of the very high molecular weight polymers useful as DRAs necessarily is done at high dilutions in a suitable solvent. Removal of large amounts of solvent thus becomes an issue, since transportation of large amounts of ineffective solvent to the site of drag reduction is an unnecessary expense. However, in the microencapsulation process, very little or no solvent is required, and the polymerization reaction may be conducted within the microcapsule (or macrocapsule) by conventional techniques. Very high molecular weight DRAs may be produced, for example on the order of 10 million weight average molecular weight or more.

For example, the polymerization of certain monomers may be conducted by the inclusion of a catalyst immediately prior to extrusion through nozzle 10, in a non-limiting example. In the case of alpha-olefins, polymerization may be conducted by the inclusion of a mixture of Ziegler-Natta catalyst and co-catalyst(s) into the monomer just prior to droplet or capsule formation. All components (monomer, catalyst, and co-catalyst(s)) required for the monomer to convert to polymer can be brought together in three different ways. These three ways are outlined below in non-limiting examples.

A dispersion of powder catalyst TiCl$_3$AA (Aluminum activated Titanium Trichloride), whose approximate size range is about 6 to about 150 microns, in a carrier solvent like mineral oil or kerosene is prepared. This is followed by the addition of the required amount of co-catalyst(s), diethylaluminum chloride and diethylaluminum ethoxide to the above catalyst dispersion. The monomer is stored in a separate vessel and is mixed with the co-catalyst(s) containing catalyst dispersion just prior to encapsulation. The advantage of this method is that the catalyst is already activated by the presence of the co-catalyst(s) and the initial reaction rates are fast. One disadvantage of this method is that the mineral oil or kerosene dilutes the monomer content of the capsule core and thus lowers the polymer yield for a given % conversion. For example the monomer content of the core is typically about 94–95 wt % when using this catalyst system. Other disadvantages include the fact that the catalyst (TiCl$_3$AA) is in the form of a solid powder and tends to settle out in the absence of mixing and can plug up the encapsulating nozzle if the core orifice is of sufficiently small diameter.

In still another non-limiting embodiment of the invention, the catalyst system can use a pre-polymerized catalyst To overcome any nozzle plugging and settling problems associated with the powder catalyst (TiCl$_3$AA) one can use a pre-polymerized catalyst dispersion. A catalyst dispersion similar to the one above would be prepared except that about 1 wt % of monomer (an α-olefin) is added to the mixture. The monomer reacts with the catalyst and forms a fine active catalyst species, which remains suspended for a long time. Also the pre-polymerized catalyst poses a much lower risk of plugging up the nozzle core orifice. The pre-polymerized catalyst can be prepared by either decanting off the fine supernatant or by using the entire pre-polymerized mixture as is. The monomer is kept stored in a separate vessel. Just before encapsulation, the monomer stream and the pre-polymerized catalyst dispersion are mixed. One disadvantage of this method is the presence of mineral oil or kerosene, which dilute the monomer content of the capsule core. Again the monomer content of the core is typically about 94–95 wt % when using this catalyst system In another non-limiting embodiment of the invention, the catalyst used may be a two-part catalyst system, where the main catalyst that initiates polymerization of the monomer, is kept separate from the co-catalyst, and cannot function without the addition of a co-catalyst. To maximize the amount of monomer in the core the following method is prescribed for bringing all the reaction components together and may be preferred if high polymer yields are important to drive product costs down. The basis for this idea is to use the monomer itself as a carrier and eliminate the mineral oil or kerosene. Keeping the catalyst (TiCl$_3$AA) and co-catalyst(s) separate until just before the encapsulation prevents any premature reaction. The required amount of catalyst (TiCl$_3$AA) is dispersed in monomer (α-olefin) or monomer mixtures and stored in a vessel. In a separate vessel the required amounts of co-catalyst (s) are mixed with the monomer or monomer mixtures.

The two streams will be mixed just before encapsulation to bring all the reactive components together. It is estimated that the monomer content of the core will be about 99.2 wt % if this method is used compared to the 94–95 wt % from the previous methods. Disadvantages of this method include the potential for catalyst to settle out, plugging of the encapsulating nozzle orifice by the catalyst particulates, and slower initial reaction rate due to the lag time for catalyst activation.

Metallocenes are useful catalysts for polymerizing some monomers. Care must be taken to avoid poisons for particular catalysts or polymerizations. For example, if Ziegler-Natta catalysts are used to polymerize α-olefins, the presence of oxygen and water (moisture) must be avoided, since they poison these catalysts. Certain monomers may be polymerized by the use of UV radiation to initiate reaction. In such a system, the shell 24 would have to be transparent to the frequency of the radiation necessary to initiate polymerization of the monomer in the core 22.

Suitable candidates for the main catalyst include, but are not necessarily limited to, aluminum activated titanium trichloride (TiCl$_3$AA). Suitable candidates for the co-catalyst include, but are not necessarily limited to, diethylaluminum chloride (DEAC), diethylaluminum ethoxide (DEALE). Of course, it will be necessary to match the co-catalyst with the main catalyst, so that the catalytic activity of the main catalyst is triggered only by the presence of a particular co-catalyst or class thereof.

Certain core polymerization systems may need to be kept in a temperature controlled environment to complete the polymerization. For example, in an exothermic polymerization, it may be necessary to keep the microcapsules cooled below a certain temperature to complete the polymerization and formation of the core 22 prior to warming and use.

Further, it is possible to encapsulate already polymerized monomer, although in most cases, it is expected that this technique will only give a dilute product. For example, core material 14 extruded through nozzle 10 could be a liquid material that is ready for use as a DRA, such as a suspension or a slurry of DRA polymer in a carrier, such as a liquid, non-solvent. Slurry concentrates having low viscosity and a high concentration of DRAs are described as being made through a carefully controlled precipitation process in U.S. Pat. No. 5,733,953, incorporated by reference herein. In one embodiment of the precipitation process, a high molecular weight polyalpha-olefin (PAO) is polymerized from the monomer or monomers in a solvent for α-olefin monomers. A suitable non-solvent for the polymers is slowly added to the neat drag reducer, which is simply the PAO in the solvent in which the polymerization occurs. The non-solvent must be added at a rate that will allow the drag reducer mixture to absorb the non-solvent. This rate depends on the amount of agitation in the mixing system used. If the rate of non-solvent addition is too high, it will make a precipitate that is not uniform in size with particles too large in size for use as a DRA in slurry form, and will contain undesirably high amounts of solvent. During the addition, the neat drag reducer will go through a viscosity reduction until the PAO precipitates. At this point, the mixture becomes a slurry concentrate of precipitated polymer particles. The weight ratio of liquid, non-solvent to solvent at this point may range from about 70/30 to 30/70, where, in one non-limiting, preferred embodiment, the ratio is about 50/50.

In some cases, the slurry concentrate will cold flow if not agitated. To reduce or prevent the cold flow, it will be necessary to remove most of the solvent. Also, the addition of blocking agents such as metal stearates and finely ground inorganic clays can help in preventing cold flow. Solvent removal can be accomplished by evaporating the solvent by heating or applying a vacuum or a combination of both. Another method would be to remove at least 50% of the solvent/liquid, non-solvent mixture and replace it with additional non-solvent. This lowers the amount of solvent in the precipitated polymer. The mixture of solvent and liquid, non-solvent would again be removed and replaced with fresh non-solvent, to further reduce the amount of solvent in the system. This process could be repeated until the desired level of residual solvent in the system was reached. By either technique, the DRA polymer could be easily concentrated to at least 15 wt %. The slurry may now be encapsulated according to this invention. In one embodiment of the precipitation process, additional solvent may be removed from the slurry concentrate by evaporating, such as through vacuum drying, or other conventional techniques such as drying, prior to microencapsulation.

It will be appreciated that the above-described preparation is analogous to a two-step extraction. However, since precipitation is also occurring in the first step, the rate of addition of the liquid, non-solvent must be carefully controlled. In one embodiment, the liquid, non-solvent is added to a point where the polymer precipitates into polymer particles of average diameter equal or less than 0.10" (0.25 cm). For the MDRA invention herein, the core material 14 may contain from about 0.5 to about 50 wt % DRA polymer, preferably between 0.5 to about 35 wt. %, where over half of the remainder would be liquid, non-solvent for the monomer to make the DRA polymer. Some very small amount of solvent for the monomer may be present; it is desirable to remove as much of the solvent as possible prior to encapsulation.

Shell Material

The shell material 18 must meet a variety of parameters. It must be inert with respect to the core material 14, for example, the liquid or semi-liquid core material 14 (e.g., in monomer form) or semi-liquid or solid core 22 (e.g., in polymerized form) and the liquid or semi-liquid shell material 18 (e.g. in monomer form) or solid shell 24 (e.g., in polymerized form) should preferably not be soluble with each other, respectively. Unformed or semi-formed shell material 18 or formed shell 24 must not substantially interfere with the polymerization occurring in the core 22, if the polymerization is not yet complete. It is possible that the shell material may interfere with the polymerization, but does so at a rate which is sufficiently slow as to be acceptable, i.e. much slower than the rate of polymerization. Further, the shell 24 must be able to be removed at the correct time so that the core material can perform as a DRA on the flowing fluid. If the shell 18 is itself a polymer, which is acceptable within the scope of this invention, then the requirements of the polymerization of the shell material 18 must be balanced with the requirements of the rest of the MDRA system.

In the case of α-olefins for core material 14, suitable shell materials may include, but are not necessarily limited to, polybutylene, polymethacrylates, waxes, polyethylene glycol (PEG), methoxylated PEG, polyethylene oxide (PEO), polyethylene waxes, and stearic acid. In one non-limiting embodiment of the invention, the shell material includes ionomeric waxes, including, but not necessarily limited to, PEG (e.g. CARBOWAX available from Union Carbide Corporation, Danbury, Conn.), polypropylene glycol (PPG), alkoxy terminated PEG (e.g. methoxylated PEG or mPEG), PEO, and polypropylene oxide (PPO). The invention can be extended to PEG/PPG, PEG/PEO, and mPEG/PEG blends of different molecular weights. Polymerization of these polymer shells is well known in the art. Shell materials for polyalpha-olefins (PAOs) must avoid the inclusion of molecular oxygen, $O_2$, but also the presence of oxygen in the form of hydroxyl groups, —OH. Further, it is possible that the presence of carbonyl groups in the shell 24 may also poison the catalyst. It is also possible that a small number of —OH or carbonyl groups in the shell can be tolerated.

Additionally, the shell 24 must be a material that will not adversely affect the ultimate use of the fluid flowing in the conduit. For example, if the conduit is carrying a hydrocarbon stream that will ultimately be used for gasoline, the particulate or soluble remnants from the shell 24 must not adversely affect carburetor, engine, or other performance.

In another embodiment of the invention, the shell materials are purified, i.e. the water is removed, by vacuum stripping and/or molecular sieve treatments. Water generally has a high diffusion rate, and the removal of water from the shell aids the polymerization of the core material. Although the invention is not limited by particular numbers or values, a reduction of 0.5% water to 0.05% water in the shell material can be accomplished in the laboratory. The shell 24 may be removed in a variety of ways, including, but not necessarily limited to, dissolution in the liquid stream, mechanical breakdown (e.g. shear), melting, photochemical breakdown, microwave heating, biodegradation, leaching, and combinations thereof. It would be unusual, for both the shell 24 and the core 22 to be soluble in the flowing liquid stream, since it would then be very likely that shell 24 and core 22 would be mutually soluble, which would be undesirable. However, it might be possible for both the shell 24 and the core 22 to be soluble in the flowing liquid stream if shell 24 was readily soluble in the liquid stream, and shell 24 relatively insoluble in core 22.

Another possibility is that shell material 18 might form a skin upon exposure to a liquid non-solvent to the shell material 18, air or other gas, where the shell would remain relatively intact during shipping of the EDRA, but which skin would not be soluble in the core 22 or a possible mixture of shell material 18 with core 22. Such a skin would be the actual shell 24, which would have to be removed through a mechanism such as those already described. When there exists a density difference between the shell material 18 and the core 22, the core tends to escape from the molten macrocapsule. Any mechanism to rapidly solidify the molten shell material 18 would help form a stable macrocapsule. In another embodiment of the invention, it is desirable to form a skin on the outside of the capsule as fast as possible to facilitate entrapment of the core material. In some trials pin holes form in the shell which permit invasion of the core material by undesirable compounds, such as those that poison the catalyst or could potentially dilute the core. Rapid skin formation is facilitated by compounds that have a high degree of crystallinity and possess a sharp melting point. For instance, shell formation with POLYOX WSR N10 (high molecular weight polyethylene oxide available from Union Carbide) forms a skin very fast on the exterior of the capsule. In one non-limiting embodiment of the invention, the polyethylene oxide is considered to have high molecular weight if the molecular weight is 100,000 weight average or higher. In another non-limiting embodiment of the invention, about 3 wt % of the shell material was POLYOX WSR N-10. When a shell material without the POLYOX WSR N-10 was used, only a very small percentage of the macrocapsules were formed intact. The majority of the macrocapsules showed ruptured shell as the core had escaped out, In contrast the POLYOX WSR N-10 containing shell material produced macrocapsules, the majority of which were intact and did not show any core leakage. The skin formed by the POLYOX WSR N-10 is essentially impervious, particularly to materials that would have a dilute effect on the core. In one non-limiting embodiment of the invention, the skin is formed over the outer surface of the shell in combination with polyethylene glycols or alkoxypolyethylene glycols.

An example of mechanical breakdown would be ultrasonic vibration of the EDRAs just prior to, during or after insertion into the liquid stream. Another example would be shear caused by pumping the EDRA into the liquid stream and/or pumping the EDRA and the liquid stream through a conduit. Melting would involve an increase in temperature to remove the shell, for example, if the shell 24 was made of a natural or synthetic wax. Photochemical breakdown would include the use of radiation, such as UV, to deteriorate for example, a polymer shell 24, made of polymethyl methacrylate, polyisobutylene, or poly(α-methylstyrene). Biodegradation would include the use of a biological agent (e.g. bacteria, enzyme, etc.) to remove the shell.

In one embodiment of the invention for microencapsulation, the outside diameter of the MDRA (outside diameter of shell 24) is about 5000 microns or less, preferably about 1000 microns or less, and in another embodiment about 500 microns or less. The core 22 has an outside diameter of about 2500 microns or less, preferably about 500 microns or less, and most preferably about 250 microns or less. In a different embodiment of the invention, the outside diameter may range from about 10 to about 150 μm. Twenty microns, in one embodiment, is a lower limit of the outside diameter. This means that the thickness of shell 24 may range from about 1250 microns or less, preferably about 250 microns or less, and most preferably about 62.5 microns or less. It will be appreciated that these dimensions can vary greatly over a wide range depending on a number of complex factors including, but not limited to, the nature of the shell 24, core 22, and the flowing liquid; the rates of removal of shell 24 and rate of dissolution of core 22 into the flowing liquid; the flow rate of the liquid; the anticipated shelf life of the MDRA, etc. It is thus very difficult to give precise dimensional limits on the MDRA physical parameters.

As noted, for macroencapsulation, the outside dimensions are above this range, on the order of greater than 5000 to about 15,000 microns in diameter (up to about 0.5 inch).

Optional Barrier Layer

In one non-limiting embodiment of the invention, the particulate, encapsulated compound has an optional barrier layer between the monomer/polymer core and the shell. Such a barrier layer may be selected from the group including, but not necessarily limited to, polybutylene, polymethacrylates, waxes, polyethylene glycol (PEG), polypropylene glycol (PPG), alkoxyl terminated PEG, polyethylene oxide (PEO), polypropylene oxide (PPO), stearic acid, polyethylene waxes, and mixtures thereof. As noted, in one embodiment, the shell material is selected from the group including, but not necessarily limited to, polybutylene, polymethacrylates, waxes, polyethylene glycol (PEG), polypropylene glycol (PPG), alkoxyl terminated PEG, polyethylene oxide (PEO), polypropylene oxide (PPO), stearic acid, polyethylene waxes, and mixtures thereof. The barrier layer and the shell material should not be the same. In some catalyst systems, such as the $TiCl_3AA$ with diethylaluminum chloride and diethylaluminum ethoxide, a PEG shell poisons the reaction to various extents, depending upon the capsule size. Paraffin waxes and polyethylene waxes made by Baker Petrolite under the trade name POLYWAX are hydrocarbon waxes and are inert to the catalysts; however, such materials will dissolve in the core (monomer and/or polymer) when the wax is in the liquid state.

In one non-limiting embodiment, there is another nozzle between the core and shell layers, which will introduce the intermediate paraffin wax stream. The paraffin wax will minimize the contact between the core and shell (e.g. PEG) layers, reduce poisoning, and allow the reaction to progress to high conversions in these systems. While there would be expected to be some dissolving of the barrier layer in the core in some systems, the process would have to be designed so that at least some portion of the barrier wax transforms to a solid interface layer between the core and the PEG shell and prevents poisoning. This barrier layer technique could potentially expand the list of suitable and available shell materials. In one embodiment, paraffin wax in the barrier layer will minimize contact between the core and shell (e.g. PEG) layers and reduce poisoning, thus allowing the polymerization reaction to progress to high conversion. In another embodiment, a blend of paraffin wax and Polywax from Baker Petrolite is used as the barrier layer. Blending of the two waxes will allow for tailoring of the wax melt point to suit the selected core and shell materials for the macroencapsulation process.

In one non-limiting embodiment of how a barrier layer might be applied, attention is directed to FIG. 2 herein (similar to FIG. 1), which is a detailed, cross-sectional view of a nozzle 30 having a central bore 32 for introduction of core material 34 and a surrounding annulus 50 for extrusion of the barrier layer material 52. Outside annulus 36 extrudes shell material 38. The different phenomena that are observed when the materials are extruded at different rates as discussed above with respect to FIG. 1, i.e. the mode of compound drop 40 formation changing with the flow rate, also apply here. Also, if the nozzle 30 is vibrated during axisymmetric breakup, capsule size distribution can be controlled to give capsules having relatively uniform diameter cores 42, barrier layers 54, and shells 44. The production rates of the EDRAs 46 is thus maximized for a given, relatively narrow size distribution.

Within the parameters of this invention, the thickness of the barrier layer is expected to range between about 5 to about 250 microns, preferably from about 10 to about 150 microns.

Optional Anti-Agglomeration Agents

It is expected that most, if not all, MDRAs prepared according to the process of this invention will not require the addition of an optional anti-agglomeration agent to reduce or prevent the tendency of the MDRA to cold flow after formation. Indeed, the use of a shell 24 or microcapsule is to avoid this problem. The absence of an anti-agglomeration agent is a significant advantage. Nevertheless, in other cases it may be desirable to add an anti-agglomeration agent during or after formation of shell 24.

In one embodiment, the weight of the anti-agglomeration agent added to the MDRA 26 is approximately equal to or less than the weight of the MDRA 26 itself. In another embodiment, it is preferred that the amount of anti-agglomeration agent range from about 75% to about 25% of the MDRA 26. Suitable anti-agglomeration agents include, but are not limited to, salts of fatty acids having 12–20 carbon atoms, specifically alkali earth metal salts of such acids, which may include, but are not limited to, magnesium stearate and calcium stearate; as well as polyethylene glycols, methoxylated polyethylene glycols, polyethylene waxes (Polywax), stearamide, ethylene-bis-stearamide, inorganic clays such as attapulgite and silicones.

Blends

It will be appreciated that blends of various particulate compounds of this invention with other active compounds in other forms would be useful, particularly when a certain effect is desired to be achieved over a period of time. For instance in the case of drag reduction, the EDRAs of the present invention could be combined with the slurry DRAs of U.S. Pat. No. 5,733,953, incorporated by reference herein. The slurry DRA would be expected to more immediately affect the drag reduction of the fluid into which the blend was introduced, whereas the EDRA would affect the drag reduction more slowly, but after the effect of the DRA slurry is largely spent, if the blend system is designed properly. Thus, through a blend of drag reducer delivery mechanisms (even if the polymeric drag reducer used in both was essentially the same), the drag reduction effect could be maintained over a longer period of time. The inclusion of EDRA with slurry DRA would ensure the presence of active polymer after the treated fluid passes through shear points in a pipeline such as a booster pump, or elbows in the line. When the polymer is not fully dissolved it is less susceptible to shear degradation. Shear degradation renders the polymer ineffective as the molecular weight decreases when the polymer is degraded.

In another embodiment of the invention, different sized capsules and/or capsules with different shell thicknesses could deliver chemicals over a period of time, or only at a certain time, within the method of this invention. In this way, the effective chemical would be delivered at times designed by the blends of size distribution and/or shell thickness distribution. Various other characteristics could be modified in a blend of materials for affecting a fluid characteristic, such as the mechanism for shell removal. That is, to pick drag reduction again as a non-limiting desirable effect, the mechanism for removing the shell from certain capsules may be more immediate than the mechanism that might be effective for removing the shells on certain other, differently encapsulated DRAs. In the specific case of DRAs, the length of the pipeline along which drag reduction is desired will also be a factor in designing a particular DRA blend. For instance, longer pipelines or pipeline with more shear points such as elbows will have a greater need for delayed action DRAs.

Delivery Media

The EDRAs of the present invention may be placed in a delivery medium prior to introduction into the liquid stream or flowing fluid to affect its friction or drag properties. The shell of the DRA may be soluble in the delivery media so that the shell dissolves at a rate suitable to deliver the core containing the DRA polymer into the liquid stream. Dissolution of the shell and/or the core can be enhanced by thermal gradients (heating) in the delivery medium. In turn, the core is soluble in the liquid stream or flowing fluid.

Thus, for example in a system where an EDRA shell is inert to hydrocarbons, but soluble in water, the delivery medium may be water or an aqueous solution, for delivering the EDRA and its polymer to a hydrocarbon fluid flowing in a pipeline.

Use of EDRAs in Flowing Fluid

It will be appreciated that the amount of EDRA added to any particular hydrocarbon, aqueous solution, or emulsion will vary greatly depending on a number of factors and cannot be specified in advance or in general. For example, some of the parameters affecting the proportion of EDRA to be added include, but are not limited to, the chemical nature of the fluid being transported, the temperature of the fluid being transported, the viscosity characteristics of the fluid, the ambient temperature of the pipeline environment, the nature of the EDRA itself (both shell and core), etc. However, in some cases, the amount of EDRA injected into the flowing hydrocarbon stream will range from about 3 to about 100 ppm, or higher; preferably from about 3 to about 50 ppm, measured as ppm of active polymer in the EDRA introduced into the fluid.

The invention will be demonstrated further with reference to the following Examples that are meant only to additionally illustrate the invention and not limit it.

EXAMPLE 1

In this Example, a vibrating nozzle technique would be used. The nozzle center bore 12 would have a diameter of 125 μm, where the annulus 16 would have an inner diameter of 130 μm and an outer diameter of 250 μm. The nozzle 10 would vibrate back and forth at a frequency of about 700 Hz to about 1000 Hz.

The core material 14 would be a mixture of alpha-olefins to give a copolymer of polyalpha-olefins as the core 22. A Ziegler-Natta catalyst, in combination with suitable activators, would be added to the core material 14 just prior to its extrusion into the nozzle 10. The Ziegler-Natta catalyst to be used would be $TiCl_3.AA$ that is available as a powder from Akzo Chemical Inc., Chicago, Ill. Diethylaluminum chloride (DEAC) and diethylaluminum ethoxide (DEALE) would serve as the preferred activators and are available in the hydrocarbon soluble liquid form from Akzo Chemical. The Ziegler-Natta catalyst would be slurried in a hydrocarbon solvent like kerosene, along with the activators that are soluble in kerosene. Because the catalyst would be poisoned by the presence of oxygen, the nozzle 10 would be housed in a nitrogen environment. The shell material 18 would be polyethylene glycol 1450 (PEG 1450, available from Union Carbide Chemicals & Plastics Co., Inc., Danbury, Conn. PEG 1450, upon heating to 50° C., may be flowed through annulus 16 of nozzle 10.

The expected flow rate of the core material 14, a mixture of alpha-olefins, would be about 3.17 kg/h and the shell material 18, PEG 1450 flow rate would be about 1.36 kg/h. The shell 24 would form relatively rapidly upon cooling in a chilled isopar bath that would be kept at about −20° C. This would permit the alpha-olefins to bulk polymerize on a small scale within the shell 24. The MDRAs 26 would be kept in a cooled environment (from about −20° C. to about 0° C.) for about 24 to 72 hours to ensure that high conversions, from monomer to polymer, are achieved. At this stage, the core 22 would be essentially greater than 95% polymer.

The expected diameter of the final polymer core 22 would be about 400 μm, whereas the expected outer diameter of the shell 24 would be about 500 μm, giving a shell thickness of about 50 μm. The production rate would be about 4.53 kg/h of MDRA having a payload of about 70% active polymer. The above mentioned production rate would be expected when one nozzle is used, and the rate could be easily increased by simply expanding the number of nozzles.

The completed MDRA particles would not cold flow together, and may be easily handled and transported. The particular MDRA of this Example would be suitable for inclusion in a flowing hydrocarbon stream, such as a crude oil in a pipeline. The MDRA particles would be shipped to pipeline injection sites in bags or super sacks. Locally available water would be used to prepare a slurry of MDRA particles in an agitated container, before injection into the crude oil pipeline. No special injection equipment would be expected to be necessary with such a slurry, or any of the MDRAs of this invention. It is expected that the MDRA PEG 1450 shell would rapidly dissolve in water and release the active polymer core (which is the drag reducing polymer for crude oil). When this slurry would be injected into the oil pipeline, the active polymer would be rapidly distributed through the entire cross section shortly after the injection point in the pipeline. The dispersed DRA particles would then dissolve in the crude oil and effect drag reduction.

EXAMPLE 2

This Example would illustrate the microencapsulation of preformed polymer DRA present in a slurry made by a controlled precipitation process. This portion of the Example is similar to that of Example 12 of U.S. Pat. No. 5,733,953, incorporated by reference herein.

The precipitation portion of the inventive process would be carried out in a Ross double planetary mixer. One hundred parts by weight of a 10% solution of FLO 1012 in isopentane would be charged to the mixer. In a separate vessel, 2 parts of magnesium stearate would be slurried in 100 parts of isopropyl alcohol. The magnesium stearate/alcohol slurry would be added in slowly to the copolymer solution with agitation over a two hour period. This procedure would produce a finely divided polyolefin precipitate that would be essentially a dispersion of very fine polymer DRA particles (100 $\mu$m to 150 $\mu$m) in isopropyl alcohol and isopentane. After precipitation, the concentration of polymer in the slurry would be about 5 wt. %. The isopentane, which would be the polymerization solvent, would be removed by simply heating the slurry, under agitation, slowly to 80° C. It might be advantageous to apply a vacuum to speed up the process. Now, the concentration of polymer in the slurry would be about 9 wt. %. At this stage 19 parts of water would be added to 100 parts of slurry. The polymer slurry could be further concentrated by continuing the application of heat and vacuum to remove the isopropyl alcohol. It is desirable to get the polymer content up as high as possible while still maintaining a fluid/flowable slurry.

When most of the isopropanol had been removed, the polymer content would be about 30 wt. %. At this stage, 10 parts of polyethylene wax would be added to 100 parts of the 30 wt. % polymer slurry in water. The polyethylene wax will melt at temperatures close to 80° C. and will exist as liquid droplets in water. In the presence of DRA polymer particles, the polyethylene wax will coat the DRA particles because of their common hydrophobicity towards water. In essence, a liquid coating or shell of polyethylene wax will form around the DRA polymer particles. This slurry would then be spray-dried to remove the water and the resulting product would be a dry powder, which is essentially DRA polymer particles encapsulated in polyethylene wax. The concentration of DRA polymer in the final product would be about 70 wt. %.

The MDRA particles would be shipped to pipeline injection sites in bags or super sacks, where it can be easily slurried in the locally available water, in an agitated container. A small heated zone will melt the polyethylene wax coating and release the DRA particle just prior to injection into the flowing crude oil stream. The DRA particles would disperse rapidly and dissolve in the crude oil, and thus drag reduce the crude oil.

EXAMPLE 3

This example would illustrate the microencapsulation of preformed polymer DRA present in a slurry made by a controlled precipitation process. This portion of the example is from Example 12 of U.S. Pat. No. 5,733,953, incorporated by reference herein.

The precipitation portion of the inventive process was carried out in a Ross double planetary mixer. One hundred parts by weight of a 10% solution of FLO 1020 in Isopentane was charged to the mixer. In a separate vessel, 2 parts of magnesium stearate was slurried in 100 parts of isopropyl alcohol. The magnesium stearate/alcohol slurry was added in slowly to the copolymer solution with agitation over a two hour period. This procedure produced a finely divided polyolefin precipitate that is essentially a dispersion of very fine polymer DRA particles (100 $\mu$m–150 $\mu$m) in isopropyl alcohol and isopentane. After precipitation, the concentration of polymer in the slurry is about 5 wt %. The isopentane which is the polymerization solvent can be removed by simply heating the slurry, under agitation, slowly to 80° C. It might be advantageous to apply a vacuum to speed up the process. Now, the concentration of polymer in the slurry is about 9 wt %. When the slurry is still at 80° C., polyethylene glycol (PEG 8000) flakes are added. The PEG 8000 is soluble in the hot isopropyl alcohol. The slurry at 80° C. is then processed over a rotating disk, where the isopropyl alcohol is flashed off, and the PEG 8000 coming out of solution coats and encapsulates the DRA particles. The encapsulated DRA particles form a free flowing powdery product.

The product would be shipped to injection sites in bags or super sacks, where it can easily be slurried in locally available water, in an agitated container. The PEG 8000 shell will dissolve in the water and release the DRA particle. Heat could be applied if desired to speed up the dissolution of the PEG 8000 shell. The aqueous slurry can then be injected into the flowing crude oil stream. The DRA particles will disperse rapidly and dissolve in the crude oil, and thus drag reduce.

EXAMPLE 4

In this Example 4, a stationary nozzle technique was used. The nozzle had an inner nozzle ID of 0.06" (about 1524 $\mu$m) and an outer nozzle ID of 0.12" (about 3048 $\mu$m). The core material 14 was 1-Decene mixed together, in the weight ratio 14.46:1.0 with catalyst formulation of Table 1. The catalyst formulation (slurry) was mixed with the 1-Decene to make the core material 14 just prior to its extrusion into the nozzle 10. The encapsulation was run with the shell at 3.4 g/min and core at 17 g/min to give a core payload of about 83.3 wt %. The core contained 94 wt % 1-Decene.

TABLE 1

| Component | Weight % |
| --- | --- |
| TiCl$_3$.AA | 1.37 |
| DEAC | 1.77 |
| DEALE | 0.64 |
| Heptane | 13.70 |
| Mineral Oil | 82.52 |
| Total | 100.00 |

The shell material 18 was a molten mixture of 67 wt % polyethylene glycol 1000, 30 wt % polyethylene glycol 8000 and 3 wt % POLYOX WSR N-10 (available from Union Carbide Chemicals & Plastics Co., Inc., Danbury, Conn.). The above, upon heating to a temperature of about 150° F. (about 65° C.), was flowed through annulus 16 of nozzle 10.

The shell 24 formed rapidly upon cooling in a chilled ISOPAR-L bath that was kept between −20 and +32° F. (approximately −29 to 0° C.). ISOPAR-L is a synthetically produced isoparaffinic solvent sold by ExxonMobil Chemical Co. The capsules were stored in the cold ISOPAR-L collection vessel for a 24 hour time period to allow for sufficient polymerization of the monomer in the core of the capsules. This permitted the 1-Decene to bulk polymerize on a small scale within the shell 24.

Successful microcapsules were prepared in the size ranging between 750 and 6000 μm, and having an approximate payload of 83.3 wt %.

After 24 hours of reaction, the completed EDRA particles were recovered by pouring the capsules and the cold ISOPAR-L over a strainer and collecting the EDRA particles. The completed EDRA particles did not cold flow together, and were easily handled and transported. EDRA particles, which had the best catalyst color, were inspected and selected for quality analysis. It was determined that the best conversion of 1-Decene to poly-1-Decene was about 81% and the best inherent drag reduction quality of the poly-1-Decene as measured in a ¼-inch line laboratory setup was 57% at a polymer concentration of 0.25 PPM. The particular EDRA of this Example would be suitable for inclusion in a flowing hydrocarbon stream, such as a crude oil in a pipeline.

EXAMPLE 5

This example uses the same shell formulation as in Example 4 but employs a pre-polymerized catalyst dispersion, which is prepared in the following manner. 4.0 g of TiCl$_3$AA was weighed into a 250 ml round bottom flask, followed by the addition of 10 ml of a 11 wt % DEAC solution in heptane which also contained 4 wt % DEALE. While stirring the resulting dispersion, 80 g of kerosene was added. The mixture was then treated with 1.2 ml of 1-Decene to initiate the formation of pre-polymerized catalyst and stirring was continued for a 24 hour period at about 70° F. (21° C.). Then the stirring was stopped and the supernatant was recovered after allowing the solution to decant for 2 hours. The supernatant contained the fine catalyst species, which resulted from the polymerization of the small amount of 1-Decene and this, was used as the catalyst for the macroencapsulation. It was determined that the supernatant contained 0.53 wt % TiCl$_3$AA.

In this Example 5, a stationary nozzle technique was used. The nozzle had an inner nozzle ID of 0.06" (about 1524 μm) and an outer nozzle ID of 0.12" (about 3048 μm). The core material 14 was 1-Decene mixed together, in the weight ratio 18.3:1.0, with the pre-polymerized catalyst above. The pre-polymerized catalyst was mixed with the 1-Decene to make the core material 14 just prior to its extrusion into the nozzle 10. The encapsulation was run with the shell at 3.4 g/min and core at 16 g/min to give a core payload of about 82.5 wt %. The core contained 95.5 wt % 1-Decene.

The shell material 18 was a molten mixture of 67 wt % polyethylene glycol 1000, 30 wt % polyethylene glycol 8000 and 3 wt % POLYOX WSR N-10 (available from Union Carbide Chemicals & Plastics Co., Inc., Danbury, Conn.). The "1000" and "8000" values of polyethylene glycol refer to molecular weight. The above, upon heating to a temperature of about 150° F. (about 65° C.), was flowed through annulus 16 of nozzle 10.

The shell 24 formed rapidly upon cooling in a chilled ISOPAR-L bath that was kept between −20 and +11° F. (approximately −29 to −11.7° C.). ISOPAR-L is a synthetically produced isoparaffinic solvent sold by ExxonMobil Chemical Co. The capsules were stored in the cold ISOPAR-L collection vessel for a 27 hour time period to allow for sufficient polymerization of the monomer in the core of the capsules. This permitted the 1-Decene to bulk polymerize on a small scale within the shell 24.

Successful microcapsules were prepared in the size ranging between 750 and 6000 μm, and having an approximate payload of 82.5 wt %. After 27 hours of reaction, the completed EDRA particles were recovered by pouring the capsules and the cold ISOPAR-L over a strainer and collecting the EDRA particles. The completed EDRA particles did not cold flow together, and were easily handled and transported. EDRA particles, which had the best catalyst color, were inspected and selected for quality analysis. It was determined that the best conversion of 1-Decene to poly-1-Decene was about 83% and the best inherent drag reduction quality of the poly-1-Decene as measured in a ¼-inch line laboratory setup was 55% at a polymer concentration of 0.25 PPM. The particular EDRA of this Example would be suitable for inclusion in a flowing hydrocarbon stream, such as a crude oil in a pipe-line.

EXAMPLE 6

This example highlights the elimination of the use of kerosene or mineral oil to act as a carrier for the catalyst and thereby increase the monomer loading in the core. The core contained 99.3 wt % 1-Decene, which is the highest in examples 4–6. The reaction system consisted of a 0.3 wt % dispersion of TiCl$_3$AA in 1-Decene and an aluminum alkyl treated 1-Decene solution containing 0.13 wt % DEAC and 0.047 wt % DEALE. This example uses a shell formulation made from 97 wt % methoxypolyethylene glycol 2000 and 3 wt % POLYOX WSR N-10.

In this Example 6, a stationary nozzle technique was used. The nozzle had an inner nozzle ID of 0.06" (about 1524 μm) and an outer nozzle ID of 0.12" (about 3048 μm). The core material 14 was a 50/50 weight mixture of the TiCl$_3$AA dispersion in 1-Decene and the aluminum alkyl solution in 1-Decene. The two reactant streams were mixed to make the core material 14 just prior to its extrusion into the nozzle 10. The encapsulation was run with the shell at 5.0 g/min and core at 16 g/min to give a core payload of about 76.2 wt %.

The shell material 18 was a molten mixture of 97 wt % methoxypolyethylene glycol 2000 and 3 wt % POLYOX WSR N-10 (available from Union Carbide Chemicals & Plastics Co., Inc., Danbury, Conn.). The above, upon heating to a temperature of about 150° F. (about 65° C.), was flowed through annulus 16 of nozzle 10.

The shell 24 formed rapidly upon cooling in a chilled ISOPAR-L bath that was kept between −20 and +32° F. (approximately −29 to 0° C.). ISOPAR-L is a synthetically produced isoparaffinic solvent sold by ExxonMobil Chemical Co. The capsules were stored in the cold ISOPAR-L collection vessel for a 21 hour time period to allow for sufficient polymerization of the monomer in the core of the capsules. This permitted the 1-Decene to bulk polymerize on a small scale within the shell 24.

Successful microcapsules were prepared in the size ranging between 750 and 6000 μm, and having an approximate payload of 76.2 wt %. After 21 hours of reaction, the completed EDRA particles were recovered by pouring the capsules and the cold ISOPAR-L over a strainer and collecting the EDRA particles. The completed EDRA particles did not cold flow together, and were easily handled and transported. EDRA particles, which had the best catalyst color, were inspected and selected for quality analysis. It was determined that the best conversion of 1-Decene to poly-1-Decene was about 76% and the best inherent drag reduction quality of the poly-1-Decene as measured in a ¼-inch line laboratory setup was 52% at a polymer concentration of 0.25 PPM. The particular EDRA of this Example would be suitable for inclusion in a flowing hydrocarbon stream, such as a crude oil in a pipeline.

The inventive microencapsulated drag reducing agents would have the advantages of quick dissolution in flowing liquids, injection into the liquids without the need for injection probes or other specialized equipment, and would not, in most embodiments, require any grinding of the polymer. Very importantly, by being microencapsulated in a protective shell, the drag reducing polymers would not cold flow together and cause handling problems. Additionally, since the MDRA and macroDRA would be almost entirely polymer, that is, have a very high concentration of polymer, with only catalyst and shell otherwise being present, the amount of material that would have to be shipped and handled would be greatly reduced. That is, no solvent would be present to dilute the active drag reducer and increase production and transportation costs. Further, the inventive MDRAs and macroDRAs would be expected to give exceptionally good drag reducing results at low concentrations, since the active polymer drag reducer is proven.

Many modifications may be made in the composition and implementation of this invention without departing from the spirit and scope thereof that are defined only in the appended claims. For example, the exact combination of DRA polymer, shell material, barrier layer (if any) and catalyst may be different from those used here. Particular processing techniques may be developed to enable the shell and polymer portions of the MDRA to work together well.

We claim:

1. A particulate compound for modifying a characteristic of a fluid, comprising:
   a core comprising the compound selected from the group consisting of:
   polymers formed within a shell;
   monomers which are polymerized within the shell, where the shell is inert to monomer polymerization; and
   the shell encapsulating the core,
   where the encapsulated compound is cryogenically ground to form the particulate compound where the shell acts as an anti-agglomeration agent.

2. The particulate compound of claim 1 where the compound is a drag reducing agent that modifies the flow resistance of the fluid.

3. The particulate compound of claim 1 where the greatest outside dimension thereof is about 1000 microns or less.

4. The particulate compound of claim 1 where the encapsulated compound is ground by a method selected from the group consisting of cryogenic grinding, pressure grinding, and combinations thereof.

5. The particulate compound of claim 1 where the polymers formed within the shell are formed from alpha-olefins and the monomers are alpha-olefins.

6. The particulate compound of claim 1 where the shell is selected from the group of materials consisting of polybutylene, polymethacrylates, waxes, polyethylene glycol (PEG), polypropylene glycol (PPG), alkoxyl terminated PEG, polyethylene oxide (PEO), polypropylene oxide (PPO), stearic acid, polyethylene waxes, and mixtures thereof.

7. An encapsulated compound for modifying a characteristic of a fluid, comprising:
   a core comprising the compound selected from the group consisting of:
   polymers formed within the shell;
   monomers which are polymerized within the shell, where the shell is inert to monomer polymerization; and
   a shell encapsulating the core, where the shell contains polyethylene oxide of a molecular weight of about 100,000 weight average where the polyethylene oxide forms a skin over the outer surface thereof.

8. The encapsulated compound of claim 7 where the compound is a drag reducing agent that modifies the flow resistance of the fluid.

9. The encapsulated compound of claim 7 where the polymers formed within the shell are formed from alpha-olefins and the monomers are alpha-olefins.

10. The encapsulated compound of claim 7 where the polyethylene oxide forms a skin over the outer surface of the shell in combination with a material selected from the group consisting of polyethylene glycols, alkoxypolyethylene glycols, and mixtures thereof.

11. An encapsulated compound for modifying a characteristic of a fluid, comprising:
    a core comprising the compound selected from the group consisting of:
    polymers formed within a shell;
    monomers that are polymerized within the shell, where the shell is inert to monomer polymerization;
    in the absence of a carrier, where the polymerization of the monomers to form the polymers is accomplished by a main catalyst, which cannot catalyze the polymerization of the monomers until a co-catalyst is added thereto;
    a co-catalyst in the core; and
    the shell encapsulating the core.

12. The encapsulated compound of claim 11 where the main catalyst is selected from the group consisting of aluminum activated titanium trichloride, titanium tetrachloride, and mixtures thereof and the co-catalyst is selected from the group consisting of diethylaluminum chloride, diethylaluminum bromide, diethylaluminum iodide, dipropylaluminum chloride, dibutylaluminum chloride, ethylpropyl aluminum chloride, ethylene dichloride, diethylaluminum ethoxide, dimethylaluminum ethoxide, diethylaluminum propoxide, ethylmethylaluminum ethoxide, isobutyl aluminoxane and mixtures thereof.

13. The encapsulated compound of claim 11 where the compound is a drag reducing agent that modifies the flow resistance of the fluid.

14. The encapsulated compound of claim 11 where the polymers formed within the shell are formed from alpha-olefins and the monomers are alpha-olefins.

15. A method for making a particulate compound for modifying a characteristic of a fluid, comprising:
    encapsulating a core with a shell where the core comprises a compound made by a process selected from the group consisting of:
    forming polymers within the shell;
    polymerizing monomers within the shell, where the shell is inert to monomer polymerization; and
    grinding the encapsulated compound to form the particulate compound.

16. The method of claim 15 where in encapsulating the core the compound is a drag reducing agent that modifies the flow resistance of the fluid.

17. The method of claim 15 where in grinding the encapsulated compound the greatest outside dimension of the particulate compound thereof is about 1000 microns or less.

18. The method of claim 15 where the grinding is conducted by a process selected from the group consisting of cryogenic grinding, pressure grinding, and combinations thereof.

19. The method of claim 15 further comprising coating the particulate compound with an anti-agglomeration agent during and/or after grinding the encapsulated compound.

20. The method of claim 15 where forming polymers within the shell and polymerizing monomers comprises polymerizing alpha-olefins.

21. The method compound of claim 15 where in encapsulating a core with a shell, the shell is selected from the group of materials consisting of polybutylene, polymethacrylates, waxes, polyethylene glycol (PEG), polypropylene glycol (PPG), alkoxyl terminated PEG, polyethylene oxide (PEO), polypropylene oxide (PPO), stearic acid, polyethylene waxes, and mixtures thereof.

22. A method of making an encapsulated drag reducing agent (EDRA) for reducing drag in a liquid stream comprising:
providing a core reaction material comprising a monomer and a pre-polymerized catalyst;
encapsulating the core reaction material in a shell, where the shell is inert to the monomer polymerization; and
polymerizing the monomer within the shell.

23. The method of claim 22 where in providing the core reaction material, the monomer is an alpha-olefin.

24. The method of claim 22 where in providing the core reaction material, the core reaction material has an absence of solvent for the monomer.

25. The method of claim 22 where in providing the core reaction material, the monomer is an alpha-olefin, and the catalyst is a Ziegler-Natta catalyst.

26. A method for making an encapsulated compound for modifying a characteristic of a fluid, comprising:
providing a core comprising the compound selected from the group consisting of:
forming polymers within the shell;
polymerizing monomers which are within the shell, where the shell is inert to monomer polymerization; and
encapsulating the core with a shell, where the shell contains polyethylene oxide of a molecular weight equal to or greater than 100,000 molecular weight where the polyethylene oxide forms a skin over the outer surface thereof.

27. The method of claim 26 where in providing a core, the compound is a drag reducing agent that modifies the flow resistance of the fluid.

28. The method of claim 26 where in providing a core, forming the polymers within the shell and polymerizing the monomers comprise polymerizing alpha-olefins.

29. The method of claim 26 where in encapsulating the core, the skin forms over the outer surface of the shell in combination with a material selected from the group consisting of polyethylene glycols, alkoxypolyethylene glycols, and mixtures thereof.

30. A method of making encapsulated compounds for modifying a characteristic of a fluid, comprising:
providing a core comprising the compound made by a process selected from the group consisting of:
forming polymers within the shell;
polymerizing monomers within the shell, where the shell is inert to monomer polymerization; and
encapsulating the core with a shell, including removing at least a portion of water from the shell by a method selected from the group consisting of vacuum stripping, molecular sieves, and combinations thereof.

31. The method of claim 30 where in providing the core the compound is a drag reducing agent that modifies the flow resistance of the fluid.

32. The method of claim 30 where in forming polymers within the shell comprise forming polymers from alpha-olefins and polymerizing monomers comprises alpha-olefins.

33. The method of claim 30 where in encapsulating the core with a shell, the shell is selected from the group of materials consisting of polybutylene, polymethacrylates, polyethylene glycol (PEG), polypropylene glycol (PPG), alkoxyl terminated PEG, polyethylene oxide (PEO), polypropylene oxide (PPO), stearic acid, paraffin waxes, polyethylene waxes, and mixtures thereof.

34. A method of making an encapsulated compound for modifying a characteristic of a fluid, comprising:
providing a core comprising the compound made by a method selected from the group consisting of:
forming polymers within a shell;
polymerizing monomers within the shell, where the shell is inert to monomer polymerization and where the polymerization of the monomers to form the polymers is accomplished by a main catalyst which cannot catalyze the polymerization of the monomers until a co-catalyst is added thereto;
adding a co-catalyst to the monomers; and
encapsulating the core with the shell.

35. The method of claim 34 where in providing the core the main catalyst is selected from the group consisting of aluminum activated titanium trichloride, titanium tetrachloride, and mixtures thereof and the co-catalyst is selected from the group consisting of diethylaluminum chloride, diethylaluminum bromide, diethylaluminum iodide, dipropylaluminum chloride, dibutylaluminum chloride, ethylpropyl aluminum chloride, ethylene dichloride, diethylaluminum ethoxide, dimethylaluminum ethoxide, diethylaluminum propoxide, ethylmethylaluminum ethoxide, isobutyl aluminoxane and mixtures thereof.

36. The method of claim 34 where in providing the core the compound is a drag reducing agent that modifies the flow resistance of the fluid.

37. The method of claim 34 where in providing the core, forming the polymers within the shell comprises forming polymers from alpha-olefins and polymerizing monomers comprises polymerizing alpha-olefins.

* * * * *

UNITED STATES PATENT AND TRADEMARK OFFICE
CERTIFICATE OF CORRECTION

PATENT NO. : 6,841,593 B2  
DATED : January 11, 2005  
INVENTOR(S) : Nagesh S. Kommareddi et al.

Figure 2:
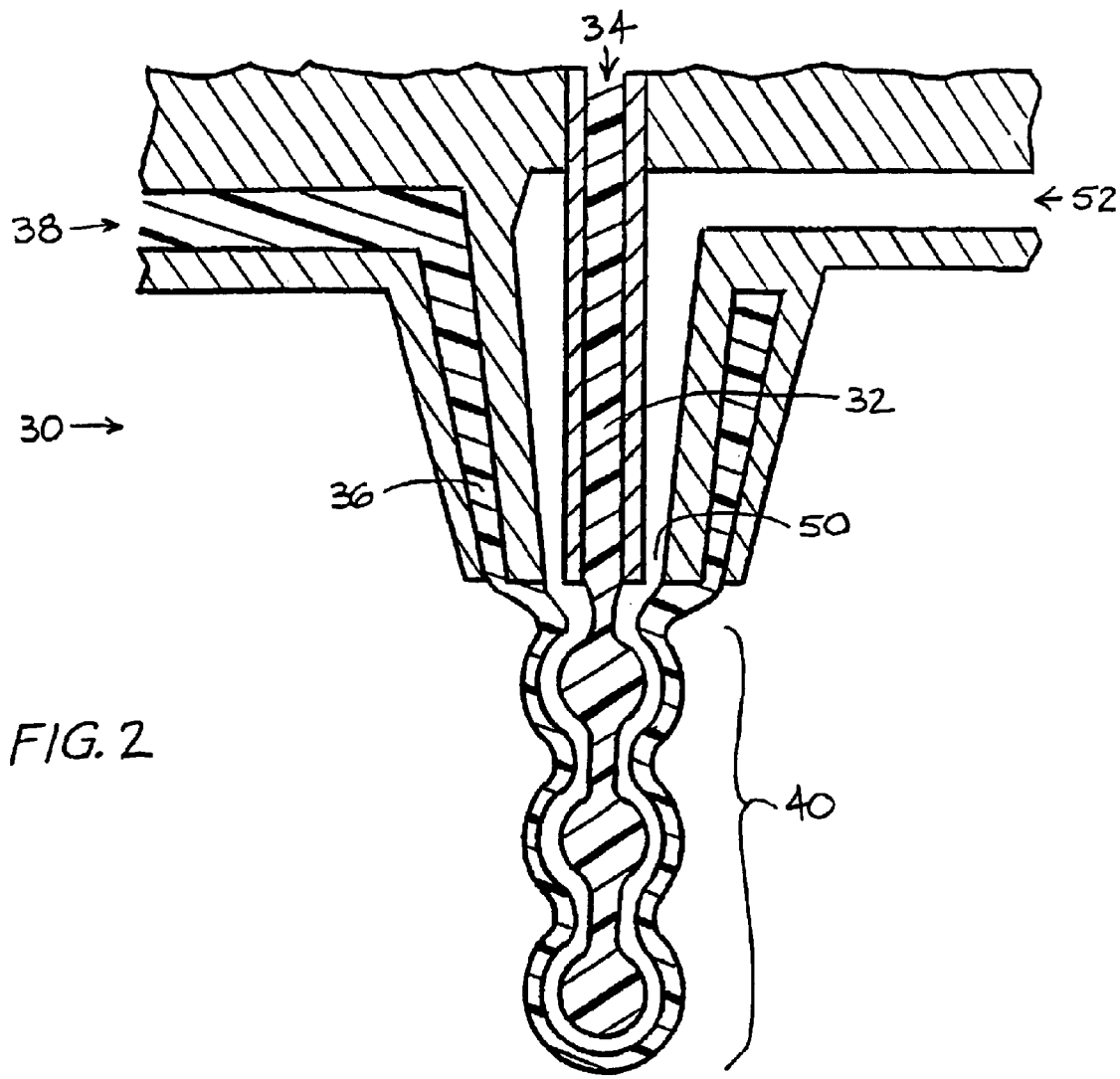
FIG. 2 is a detailed, sectional view of a stationary extrusion nozzle forming a microencapsulated drag reducing agent including an intermediate barrier layer, by axisymmetric jet breakup.

It is certified that error appears in the above-identified patent and that said Letters Patent is hereby corrected as shown below:

Drawings,
Delete Figure 2 and insert formal drawing Figure 2 as shown below:

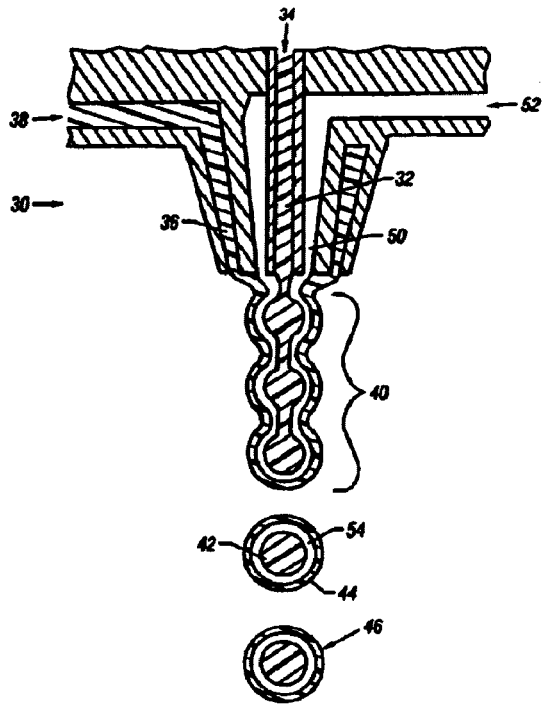

FIG. 2

Signed and Sealed this

Twenty-eighth Day of March, 2006

JON W. DUDAS  
*Director of the United States Patent and Trademark Office*